M. M. BORDEN.
LIQUID GAGE.
APPLICATION FILED DEC. 3, 1908.
973,101.
Patented Oct. 18, 1910.
2 SHEETS—SHEET 1.
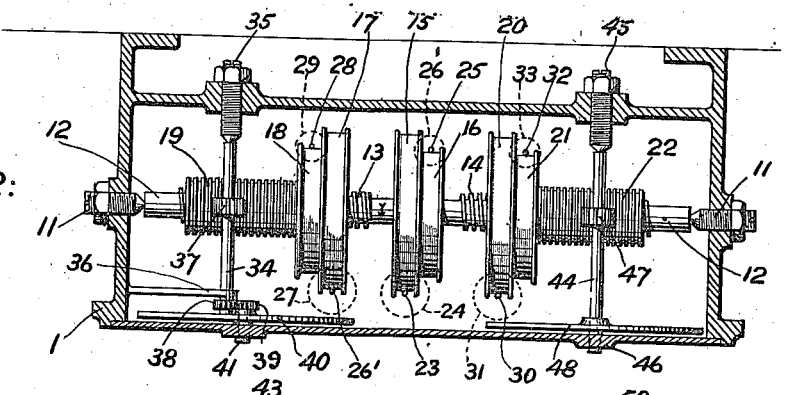
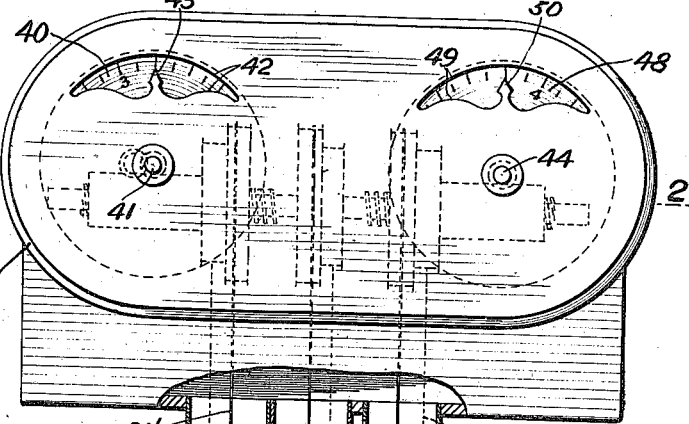
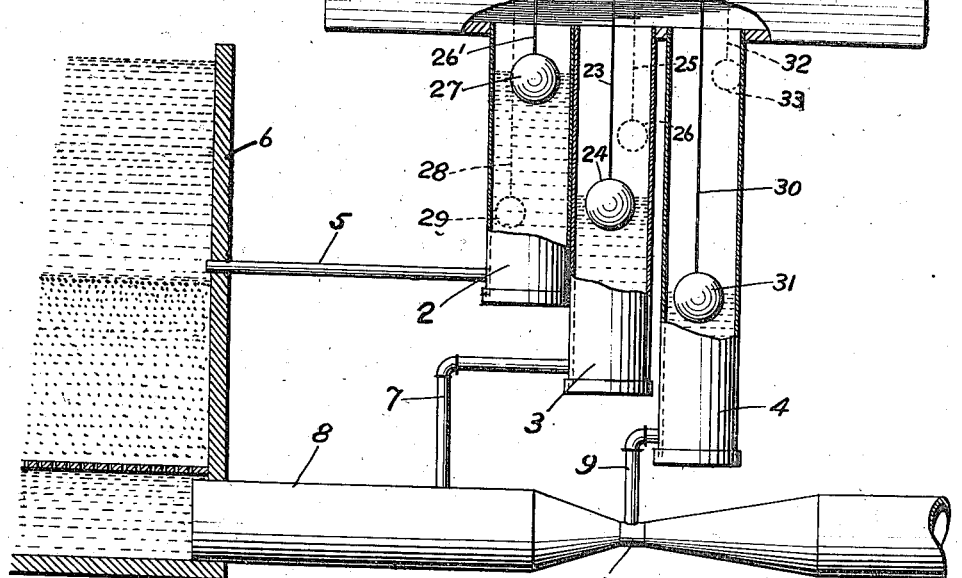
WITNESSES:
INVENTOR
BY
ATTORNEY.

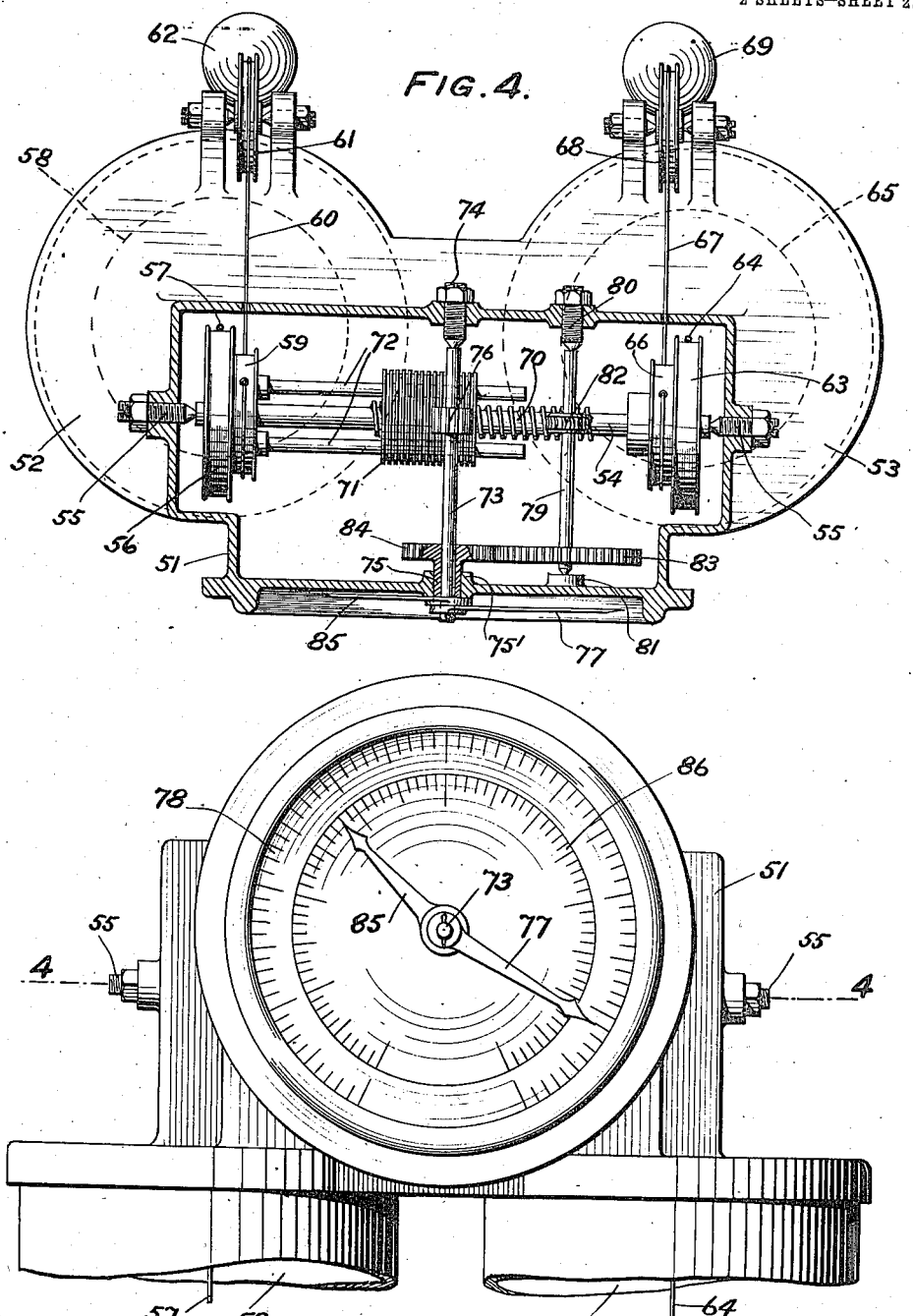

UNITED STATES PATENT OFFICE.

MORO M. BORDEN, OF COLLINGSWOOD, NEW JERSEY, ASSIGNOR TO SIMPLEX VALVE AND METER COMPANY, OF CAMDEN, NEW JERSEY, A CORPORATION OF NEW JERSEY.

LIQUID-GAGE.

973,101. Specification of Letters Patent. Patented Oct. 18, 1910.

Application filed December 3, 1908. Serial No. 465,777.

*To all whom it may concern:*

Be it known that I, MORO M. BORDEN, a citizen of the United States, residing at Collingswood, in the county of Camden, and State of New Jersey, have invented certain Improvements in Liquid-Gages.

My invention relates to liquid gages for indicating differential pressures and it is designed particularly for indicating rate of flow and loss of head by improved means for differentiating the heights to which liquid rises due to various pressures.

The characteristic features of the improvements are fully disclosed in the following description and the accompanying drawings in illustration thereof.

In the drawings, Figure 1 is a sectional elevation representing my improvements applied to the measurement of the rate of flow through a conduit and the loss of head in a filter connected therewith; Fig. 2 is a sectional view taken on the line 2—2 of Fig. 1; Fig. 3 is an elevation representing a modification in the construction; and Fig. 4 is a sectional plan view taken on the line 4—4 of Fig. 3.

In the form of the invention represented in Figs. 1 and 2, a casing 1 has depending therefrom the chambers 2, 3, and 4. The bottom of the chamber 2 is connected by a pipe 5 with a filter 6 at a point above its bed, the bottom of the chamber 3 is connected by a pipe 7 with a normal section 8 of a conduit leading from the filter, and the bottom of the chamber 4 is connected by a pipe 9 with the throat of a venturi section 10 connected with the conduit section 8. The casing 1 has set in the ends thereof the adjustable pivotal bearings 11 which engage the ends of a revoluble shaft 12 having screws 13 and 14 thereon.

Sheaves 15 and 16 are fixed to the shaft, sheaves 17 and 18 integrally connected with a cylindrical rack 19 are movable along the shaft by the screw 13, and sheaves 20 and 21 integrally connected with a cylindrical rack 22 are movable along the shaft by the screw 14. The sheave 15 carries a cord or wire 23 having on the lower end thereof a float 24 which is movable in the chamber 3 with variations in the height of liquid supporting it therein. The sheave 16 carries a cord or wire 25 with a weight 26 thereon for counterbalancing the float 24. The sheave 17 carries a wire or cord 26' connected with a float 27 which is movable in the chamber 2 with variations in the height of the liquid supporting it therein, the float being counterbalanced by means of a cord or wire 28 connected with the sheave 18 and a weight 29 connected with this cord. The sheave 20 carries a cord or wire 30 by which a float 31 is suspended in the chamber 4 and rests upon the liquid column therein, the float being counterbalanced by means of a cord or wire 32 fixed to the sheave 21 and a weight 33 fixed to this cord.

A shaft 34, journaled in the bearings 35 and 36, has fixed thereon a gear wheel 37, which engages the cylindrical rack 19, and a gear wheel 38, which engages a gear wheel 39 fixed to the graduated dial 40, the latter having a journal 41 carried by the casing whereby the graduations of the dial are revoluble past the casing opening 42 and the stationary pointer 43. A shaft 44, journaled in the bearings 45 and 46, has fixed thereon a gear wheel 47 which engages the cylindrical rack 22. A graduated dial 48 is fixed on the shaft 44 so that its graduations are revoluble past the casing opening 49 and the stationary pointer 50.

In the operation of the apparatus, the pressure of the liquid in the top of the filter 6 will maintain liquid at the same level in the chamber 2, and the pressure of liquid in the conduit section 8 will maintain liquid in the chamber 3, so that the difference in the levels of the liquid in these chambers will depend upon the resistance offered by the filter bed which is disposed between them and consequently the differences between the levels in these chambers are functions of the loss of head due to the obstruction to flow offered by the bed. When there is no flow in the conduit, the columns in these chambers will stand at the same level under normal conditions. When the flow in the conduit starts or increases, the head in the filter being maintained, the liquid and the float in the chamber 3 will fall, the movement of the float will cause the sheaves 15 and 16 to be revolved and revolve the shaft 12 in the direction of the arrow, the consequent revolution of the screw 13 will move the cylindrical rack 19 longitudinally away from the sheave 15 to the extent determined by the difference between the heights of the floats 24 and 27, and the movement of the rack will revolve the shaft 34 and the dial 40 so that the loss of head will be indicated on the dial by the pointer 43. It will be understood that the result of the movement of the shaft 12 by the float 24 will be modified by the movement of the float 27, due to the height of the water in the filter, which, on falling effects a downward movement of the float 27 and a revolution of the cylindrical rack 19 in the direction of the arrow, by which this rack has a tendency to move through its connection with the worm 13 in the direction of the sheave 15. Hence the pointer will indicate upon the dial the differential movements of these floats. When there is no flow in the conduit, the liquid therein will rise to the same level in chambers 3 and 4, and as the flow increases from zero the difference in the liquid levels in these two chambers will increase, the difference in level being a function of the rate of flow. A change in the elevation of the liquid and the float in the chamber 3 will revolve the rod 12 and its screw 14 which acts to move the cylindrical rack 22 longitudinally and revolve the shaft 44 with the dial 48 thereon. A change in elevation of the liquid and the float in the chamber 4 revolves the sheaves 20 and 21 which by reason of the engagement with the screw 14 tends to move the rack 47 longitudinally and revolve the dial 48. Hence the movements of these floats are differentiated and the rate of flow indicated by the movement of the dial past the stationary pointer 50.

In the modification shown in Figs. 3 and 4, the casing 51, with the float chambers 52 and 53 depending therefrom, contains a shaft 54 journaled between the pivotal bearings 55. The sheave 56 is journaled on this shaft and carries the cord or wire 57 which is connected with the float 58 in the chamber 52. The sheave 59 is fixed to the sheave 56 and carries a cord 60 which passes over a sheave 61 to a weight 62 for counterbalancing the float 58. The sheave 63 is fixed to the shaft 54 and carries the cord or wire 64 which supports the float 65 in the chamber 53 and fixed to the sheave 63 is the sheave 66 which carries a cord 67 passing over a sheave 68 to a weight 69 for counterbalancing the float 65. The shaft 54 is provided with a screw or worm 70 and engaged thereby is a cylindrical rack 71 movable on the guides 72 which are fixed to and revoluble with the sheave 59. A revoluble shaft 73, journaled in the bearings 74 and 75, has fixed thereon a gear wheel 76, which engages the rack 71, and a pointer 77 which is movable over a dial 78. A revoluble shaft 79, journaled between the bearings 80 and 81, has fixed thereon a worm wheel 82, which engages the worm 70, and a gear wheel 83 which engages the gear wheel 84. The wheeel 84 is fixed to the sleeve 75 which is journaled in the bearing 75' and carries the pointer 85 movable over the dial 86. It will be understood that the vertical movement of the float 58 revolves the sheaves 56 and 59 and the rack 71 on the shaft 54, whereby the worm 70 tends to cause the rack to move longitudinally to revolve the gear wheel 76 and shaft 73, the movement being indicated by the pointer 77 on the dial 78. The vertical movement of the float 65 revolves the sheaves 63 and 66 together with the shaft 54 and by the revolution of the latter its worm revolves the worm wheel 82 and tends to move the rack 71 longitudinally, to move the gear 76, shaft 73 and pointer 77. Consequently the movements of the floats will be differentiated by the intermediate mechanism and the pointer will indicate on the dial 78 either loss of head or rate of flow, depending upon the manner of operating the floats. The revolution of the worm wheel 82 causes the shaft 79 to act through the gear wheels 83 and 84 to revolve the pointer 85 over the dial 86, by which the movements of the float 65 may be indicated and consequently variations in level in the liquid supporting it.

Having described my invention, I claim:

1. In a liquid gage, a revoluble shaft having a screw thereon, a rack engaged by said screw and movable longitudinally on said shaft, a second revoluble shaft, a pinion on said second shaft engaged by said rack, means comprising an indicating device connected with and operated by said second shaft, a sheave connected with and adapted for revolving said shaft first named, a sheave connected with and adapted for revolving said rack, floats, means whereby said floats are connected with and adapted for revolving the respective sheaves, chambers containing the respective floats, a conduit, and means for connecting different sections of said conduit with the respective chambers.

2. In a liquid gage, a revoluble shaft having a screw thereon, a rack engaged by said screw and movable longitudinally on said shaft, a second revoluble shaft, a pinion on said second shaft and engaged by said rack, means comprising an indicating device connected with and operated by said second shaft, a sheave connected with and adapted for revolving said shaft first named, a sheave connected with and adapted for revolving said rack, floats, means whereby said floats are connected with and adapted for revolving the respective sheaves, chambers containing the respective floats, a filter bed, and means whereby liquid pressures are communicated from points above and below said filter bed to the respective chambers.

3. In a liquid gage, in combination with a conduit having a contracted section, a chamber, means whereby said chamber is connected with a normal section of said conduit, a second chamber, means whereby said second chamber is connected with said contracted section of said conduit, floats in said chambers respectively, a revoluble shaft having a screw thereon, a rack sleeved on said shaft in engagement with said screw, a sheave connected with and adapted to revolve said shaft, means whereby one of said floats revolves said sheave, a sheave connected with and adapted to revolve said rack, means whereby the other of said floats revolves said sheave last named, and indicating means connected with and operated by said rack.

4. In a liquid gage, a revoluble shaft having a screw thereon, a wheel engaged and operated by said screw, indicating mechanism operated by said wheel, a revoluble rack movable by said screw, a wheel engaged and operated by said rack, indicating mechanism operated by said wheel last named, and differential mechanism for operating said screw and rack.

In witness whereof I have hereunto set my name this 30th day of November A. D. 1908, in the presence of the subscribing witnesses.

MORO M. BORDEN.

Witnesses:
  ROBERT JAMES EARLEY,
  JOS. G. DENNY, Jr.